United States Patent
Heinrich et al.

(10) Patent No.: US 8,705,589 B2
(45) Date of Patent: Apr. 22, 2014

(54) METHOD FOR PULSE-BASED ULTRA-BROADBAND COMMUNICATION BETWEEN AT LEAST ONE TRANSMITTING NODE AND AT LEAST ONE RECEIVING NODE

(75) Inventors: Andreas Heinrich, München (DE); Johannes Hund, München (DE); Christian Schwingenschlögl, Putzbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 241 days.

(21) Appl. No.: 12/998,398

(22) PCT Filed: Sep. 24, 2009

(86) PCT No.: PCT/EP2009/062373
§ 371 (c)(1),
(2), (4) Date: Jul. 7, 2011

(87) PCT Pub. No.: WO2010/043480
PCT Pub. Date: Apr. 22, 2010

(65) Prior Publication Data
US 2011/0268156 A1  Nov. 3, 2011

(30) Foreign Application Priority Data
Oct. 15, 2008  (DE) .......................... 10 2008 051 822

(51) Int. Cl.
*H04B 1/7163* (2011.01)
(52) U.S. Cl.
USPC .......................................................... 375/130

(58) Field of Classification Search
USPC .......................................................... 375/130
See application file for complete search history.

(56) References Cited

U.S. PATENT DOCUMENTS

2004/0090353 A1*  5/2004  Moore ............................ 341/53
2004/0218687 A1* 11/2004  Santhoff ........................ 375/295
(Continued)

FOREIGN PATENT DOCUMENTS

| CN | 101267424 A | 9/2008 |
|----|-------------|--------|
| DE | 102008051822.0 | 10/2008 |

OTHER PUBLICATIONS

Nasiri-Kenari et al.; "Performance analysis and comparison of different multirate TH-UWB systems: uncoded and coded schemes"; IEE Proceedings: Communications, vol. 152, No. 6, Dec. 2005; pp. 833-844.

(Continued)

*Primary Examiner* — Don N Vo
(74) *Attorney, Agent, or Firm* — Staas & Halsey LLP

(57) ABSTRACT

An ultra-broadband signal having a plurality of pulses is transmitted from one or more transmitting nodes to one or more receiving nodes. In the ultra-broadband signal, data are transmitted by pulses having a first pulse rate in a first data transmission and by pulses having a second pulse rate in at least one second data transmission, with each second pulse rate higher than the first pulse rate. The pulses having the second pulse rate are transmitted in intervals, during which no pulses having the first pulse rate are transmitted. This has the advantage that by utilizing time gaps between pulses of the first data transmission, the data of a second data transmission can be transmitted at a higher pulse rate. The transmitting and receiving nodes need not be coordinated explicitly or coordinated from the outside.

23 Claims, 13 Drawing Sheets

(56) References Cited

U.S. PATENT DOCUMENTS

| | | | |
|---|---|---|---|
| 2005/0030885 A1 | 2/2005 | Langley et al. | |
| 2006/0015892 A1* | 1/2006 | Hirt et al. | 725/10 |
| 2008/0117804 A1 | 5/2008 | Ekbal et al. | |
| 2008/0220732 A1* | 9/2008 | Ikramov et al. | 455/114.3 |
| 2010/0328047 A1* | 12/2010 | Jantunen et al. | 340/10.4 |

OTHER PUBLICATIONS

Wymeersch et al.; "SNR Analysis for Multi-Rate UWB-IR"; IEEE Communications Letter, vol. 11, No. 1, Jan. 2007; pp. 49-51.

Wymeersch et al.; "SNR Analysis of Multi-Rate IR-UWB Over Frequency-Selective Channels"; IEEE International Conference on Ultra-Wideband (ICUWB) 2007; Sep. 2007; pp. 545-550.

Wymeersch et al.; "ML rate detection for multi-rate TH-UWB impulse radio"; IEEE International Conference on Ultra-Wideband; Sep. 2005, pp. 391-395.

IEEE Standard 802.15.4aTM-2007; Wireless Medium Access Control (MAC) and Physical Layer (PHY) Specification for Low-Rate Wireless Personal Area Networks (WPANs); Amendment 1: Add Alternate PHYs; pp. 1-187.

August et al.; "Distributed MAC Protocols for UWB Ad Hoc and Sensor Networks"; IEEE Radio and Wireless Symposium 2006; Jan. 2006; pp. 511-514.

International Search Report for Application No. PCT/EP2009/062373; mailed Dec. 18, 2009.

Office Action issued Mar. 26, 2013 in corresponding Chinese Patent Application No. 200980141028.4.

* cited by examiner

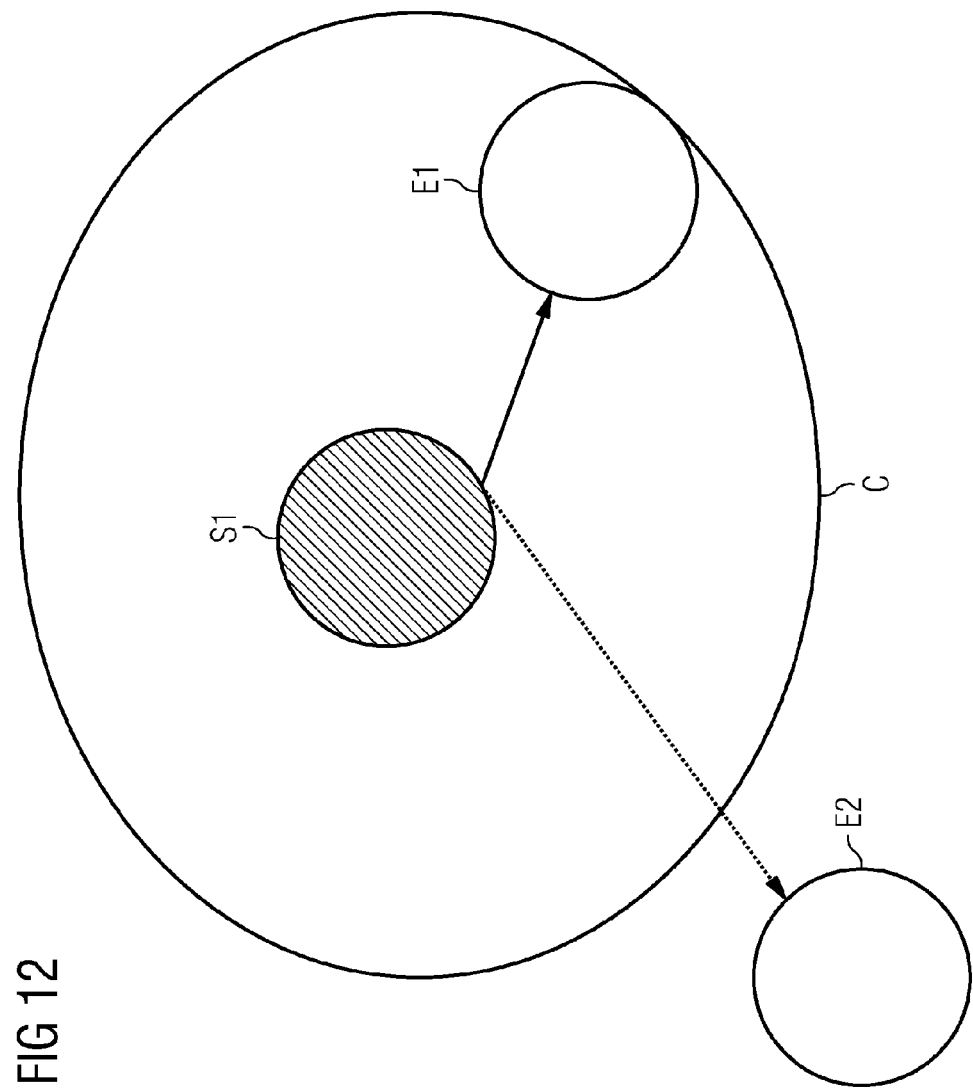

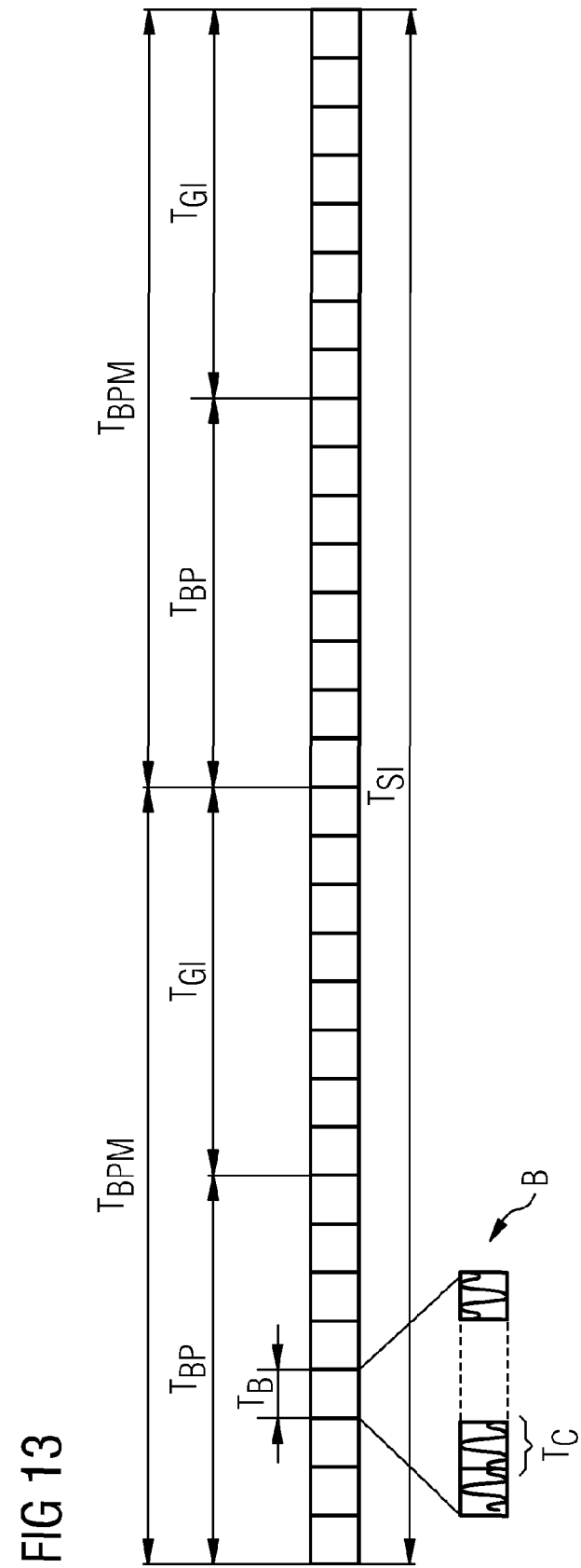

METHOD FOR PULSE-BASED ULTRA-BROADBAND COMMUNICATION BETWEEN AT LEAST ONE TRANSMITTING NODE AND AT LEAST ONE RECEIVING NODE

CROSS REFERENCE TO RELATED APPLICATIONS

This application is the U.S. national stage of International Application No. PCT/EP2009/062373, filed Sep. 24, 2009 and claims the benefit thereof. The International Application claims the benefits of German Application No. 102008051822.0 filed on Oct. 15, 2008, both applications are incorporated by reference herein in their entirety.

BACKGROUND

Described below is a method for pulse-based ultra wide band communication between at least one transmitting node and at least one receiving node.

The technical field of ultra wide band communication, which is also referred to below as UWB communication (Ultra Wide Band) communication is relevant. UWB technology involves near field radio communication which uses very large frequency ranges with a bandwidth of at least 500 MHz or of at least 20% of the arithmetic mean of lower and upper limit frequency of the frequency band used. To keep interference between UWB communication and other wireless communication systems, such as WLAN for example, as low as possible, the average maximum allowed energy for UWB signals for transmission of the signals is prescribed by regulatory authorities. A variant of UWB systems is currently defined by Standard IEEE 802.15.4a. This standard describes media access for UWB communication systems based on impulse radio technology. The communication involved here is a pulse-based UWB communication in which information is encoded independent of frequency by pulses in the UWB signals.

One of the regulatory requirements in respect of UWB transmission satisfying the maximum allowed energy allows either a data transmission with high pulse rates with low energy per pulse or with low pulse rates with high energy per pulse. Although high data rates can be achieved with high pulse rates, because energy falls away with increasing distance during transmission in air, only short ranges can be covered. The higher pulse energy allowed for transmission with a low pulse rate, although offering greater ranges, only provides them at lower data rates.

Currently pulse-based UWB systems with a fixed pulse rate are used. These allow either fast data transmission over short distances or slow data transmission with a long range. In such cases the problem arises that with a number of transmitting and receiving nodes which split the transmission medium, high-bit-rate UWB communication cannot be operated at the same time as low-bit-rate UWB communication. In particular the high pulse energy of the low-bit-rate UWB transmission disrupts high-bit-rate data transmission over a relatively wide area and collisions between the two data transmissions in the jointly-used frequency band result.

SUMMARY

An aspect is to create pulse-based ultra wide band communication between transmitting node and receiving node in which a number of data transmissions with different data rates are made possible at the same time.

In the method an ultra wide band signal, having a plurality of pulses, is transmitted from one or more transmitting nodes to one or more receiving nodes. In such cases a transmitting node can also receive data and/or a receiving node can also transmit data. Data is transmitted in the ultra wide band signal in a first data transmission by pulses with a first pulse rate and in at least one second data transmission by pulses with respective second pulse rate(s). Each second data transmission is assigned a respective second pulse rate which is higher than the first pulse rate. To achieve simultaneous data transmission with a number of pulse rates, the pulses are transmitted in this case with a respective second pulse rate in the intervals in which no pulses of the first pulse rate are being transmitted.

In pulse-based data transmission with a (low) first pulse rate time gaps between individual pulses or individual pulse sequences respectively can be used for transmission of data at a higher pulse rate in the gaps. A receiving node which receives at one of the pulse rates, i.e. at the first or at one of the second pulse rates, is configured in such cases such that it only considers pulses intended for it and ignores the remaining pulses in the UWB signal.

In an embodiment of the method, the pulses of the ultra wide band signal are transmitted continuously in consecutive time windows with a constant length, with each time window containing an individual pulse. In particular in such cases a time window with a pulse of the first pulse rate is followed by a time window with a pulse of the respective second pulse rate. In such cases a first time window of the consecutive time windows may be provided for pulses of the first pulse rate and second time window for pulses of a respective second pulse rate, with the first or the respective second pulse rate being given by the repeat rate of the first or the second time window. In this way data transmissions with a number of pulse rates are implemented especially simply by time windows between the pulses of the first pulse rate being used to transmit pulses with a correspondingly higher pulse rate in these time windows. This variant of the method leads to the respective second pulse rates being multiples of the first pulse rate. If a number of second data transmissions are realized in the UWB signal, the pulses of the second respective data transmissions are also nested so that only one pulse of an individual second data transmission ever occurs in one time window.

In another embodiment of the method, both the first data transmission and also at least one second data transmission take place between an individual transmitting node and an individual receiving node. This variant of the method is used for example to suppress further data transmissions originating from other transmitting nodes within the range of the individual transmitting node. This is especially achieved by a prespecified signal pattern being transferred with the first data transmission, whereby for receiving nodes within the range of the individual transmitting node, a first data transmission from other transmitting notes is blocked, since collisions can be caused by the prespecified signal pattern.

In a further variant of the method a single first or a respective second data transmission is carried out exclusively for transmitting and receiving nodes within the range of each other between a pair formed of one transmitting node and one receiving node. This guarantees that, for transmitting and receiving nodes which use the same transmission medium, one of the data transmissions only occurs once. This makes it possible for the data transmissions not to block each other and allows user data to be transferred in parallel in the UWB system for each data transmission. Transmitting and receiving nodes within the range of each other are to be understood in this case as transmitting and receiving nodes in which no transmitting or receiving node lies out of range of all other transmitting or receiving nodes.

To avoid collisions between the individual data transmissions, in a variant of the method, a time slot protocol such as Slotted CSMA (CSMA=Carrier Sense Multiple Access) for example, is used.

In a variant of the method, the transmitting node and the receiving node synchronize with each other by synchronization preambles known from the related art. A transmitting node and a receiving node that wish to transmit data in the second data transmission may listen to the first data transmission in such cases and synchronize, on hearing a synchronization preamble, to the preamble. In the event of the transmitting node and the receiving node not hearing any synchronization preamble on the first data transmission, in a variant of the method the transmitting node transmits a synchronization preamble for synchronization via the second data transmission.

In a further embodiment of the method, a transmitting node which is transmitting data by the second data transmission can also listen for the pulse of the first pulse rate in order to synchronize itself to the pulse rate or to correct a synchronization which has already taken place accordingly.

In a further variant of the method, a transmitting and receiving node, between which data is to be transmitted, signal to each other when a second data transmission is possible in order subsequently to transmit the data to be transmitted by the second data transmission. In this way it is ensured that whenever a faster data transmission is possible, the transmission is also used. Transmitting or receiving nodes can typically establish from the signal-to-noise ratio of the transmitted signal that they are near enough to each other for a data transmission at a higher pulse rate to be possible.

In a further embodiment of the method, the first data transmission is carried out such that the pulses with the first pulse rate are transmitted in bursts of at least one pulse, with bursts occurring at prespecified intervals which are separated from each other by guard intervals and with a respective second data transmission being carried out by pulses with a second pulse rate in the guard intervals. The transmission of bursts in such cases can be used as an alternative to or in addition to continuous transmission of pulses in time windows with a constant length. The advantage of this variant is that an already standardized method in accordance with Standard IEEE 802.15.4a can be used. In such cases the pulses of the second pulse rate are transmitted in the so-called guard intervals in accordance with a symbol structure of this standard. The guard intervals act as a safety interval in order to reduce the intersymbol interference.

In a variant, the entirety of the guard intervals is used for second data transmission, through which a high pulse rate is achieved for the second data transmission. Furthermore transmitted data may be pulse-modulated by the pulses with the second pulse rate, i.e. each pulse carries bit information. A high data rate is also achieved by this. If necessary the data transmitted by the pulses with the second pulse rate can however also be burst-modulated, i.e. each burst carries bit information. The redundancy in the data transmission is increased by this, but this leads to a lower data rate however.

As well as the method described above, described below is a communication network for pulsed-based ultra wide band communication with at least one transmitting node and at least one receiving node which communicate during operation such that each variant of the method described above is able to be executed in the communication network.

BRIEF DESCRIPTION OF THE DRAWINGS

These and other aspects and advantages will become more apparent and more readily appreciated from the following description of the exemplary embodiments, taken in conjunction with the accompanying drawings of which:

FIGS. 4-12 are schematic diagrams of different scenarios, in which nodes based on variants of the method communicate with each other; and FIG. 13 is a schematic diagram of the transmission of a UWB signal in accordance with a third embodiment of the method.

DETAILED DESCRIPTION OF THE PREFERRED EMBODIMENT

Figure 1:
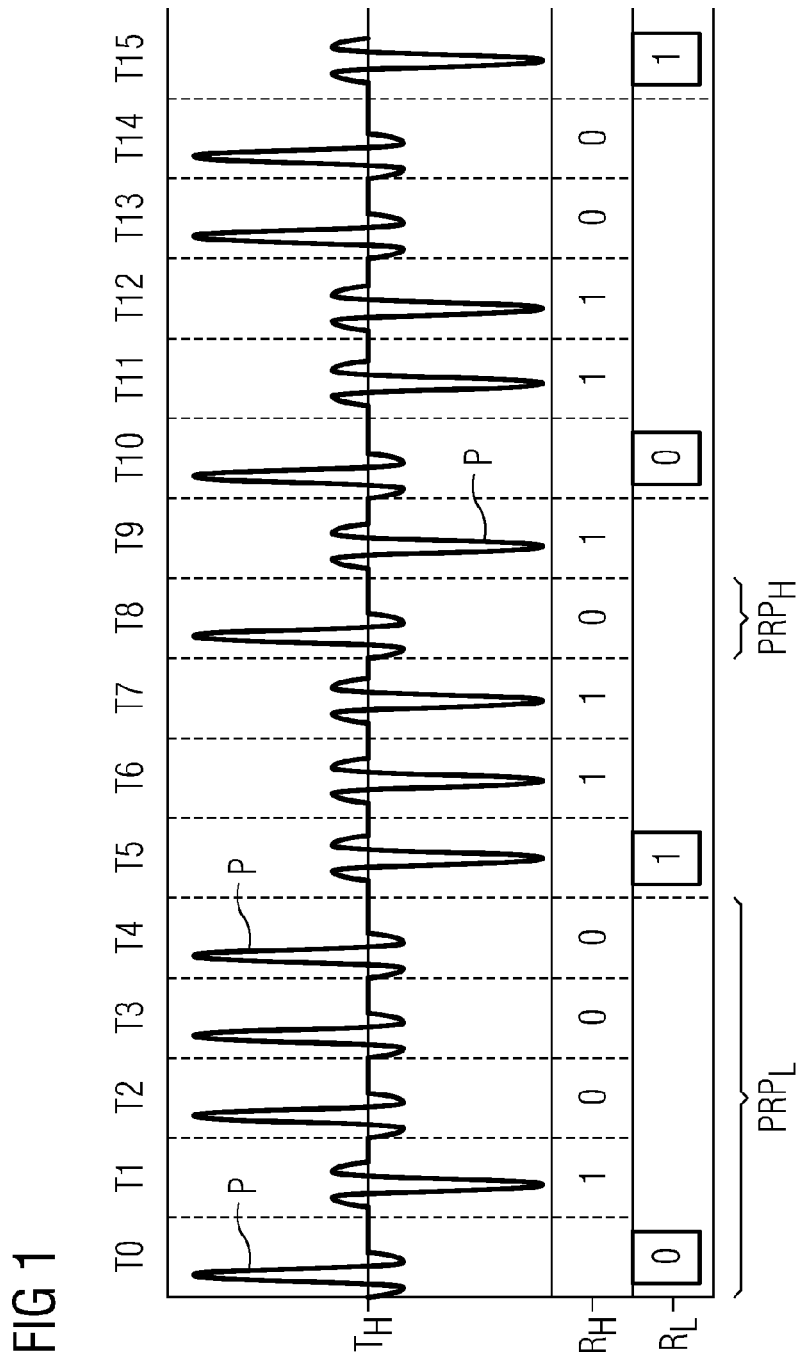
FIG. 1 is a schematic diagram of the transmission of a UWB signal in accordance with a first embodiment of the method.

Reference will now be made in detail to the preferred embodiments, examples of which are illustrated in the accompanying drawings, wherein like reference numerals refer to like elements throughout.

Two embodiments of the method are first explained below in which the transmission of the UWB signal occurs continuously through pulses in consecutive time windows. On the basis of the pulses a first transmission occurs in this case in the UWB signal with the low pulse rate and long range as well as a second data transmission with a high pulse rate and a short range.

FIG. 1 shows a UWB signal in accordance of the first embodiment of the method. In FIG. 1 the time axis extends in the horizontal direction, with corresponding time windows in which an individual pulse is transmitted in each case being identified by T0, T1, ..., T15. By way of example a few of the pulses are labeled with the reference character P in this case. In the scenario of FIG. 1 a UWB signal is generated by a so-called transceiver $T_H$ which transmits with a high pulse rate. The transceiver represents a transmitting node in this case. As well as its function as transmitting node, the transceiver can however also function as a receiving node.

The UWB signal generated by the transceiver contains data which is transmitted by pulses with a high pulse rate as well as data which is transmitted by pulses with a low pulse rate. The signal is received by a receiver or receiving node $R_H$ which only processes the pulses transmitted with the high pulse rate. The pulses transmitted with the low pulse rate, in the scenario of FIG. 1 prevent a further receiver $R_L$, which processes pulses with a low pulse rate, being able to receive UWB signals from other transmitters at the low pulse rate.

In the form of embodiment of FIG. 1 a data transmission at two pulse rates is made possible by some of the time windows being reserved for the transmission with the high pulse rate and some others for transmission with the low pulse rate. In FIG. 1 pulses with a high pulse rate are transmitted in the time windows T1, T2, T3, T4, T6, T7, T8, T9, T11, T12, T13, T14, while pulses with a low pulse rate are contained in the time windows T0, T5, T10 and T15. In other words corresponding gaps in the transmission with the low rate are used for the transmission with the high rate. The repeat period for the pulses of the high rate corresponds in this case essentially to the size of the time window and is labeled $PRP_H$ in FIG. 1. By contrast the repeat period for the pulses of the low rate corresponds to five time windows and is labeled $PRP_L$ in FIG. 1.

In the receiving node $R_H$, which receives with a high pulse rate the corresponding pulses in the time windows T0, T5, T10 and T15 are ignored. Similarly in the receiver $R_L$, which receives with the low pulse rate, only the pulses in the time windows T0, T5, T10 and T15 are considered and the remaining pulses in the time windows T1 to T4, T6 to T9 and T11 to T14 are ignored. In accordance with the form of embodiment of FIG. 1, a high pulse rate is thus created which is a multiple of the low pulse rate. If necessary the UWB signal can also be configured to provide a number of high pulse rates, with the pulses of the high rate neither overlapping with each other nor with the pulses of the low rate. All these higher rates in this case are once again multiples of the low pulse rate.

In FIG. 1 the individual pulses P are represented by corresponding positive and negative peaks, with a 0-bit being transmitted by a positive peak and a 1-bit by a negative peak. In FIG. 1 a predetermined signal pattern is transmitted from the transceiver $T_H$ as a busy tone (i.e. as a busy signal) by the pulses of the low rate. In this case the signal sequence 01010 . . . is used as the busy tone, but any other signal sequence is also able to be used for this tone. This busy tone is received by each receiving node $R_L$ within range of the transceiver and prevents the receipt of data at the lower rate from other transceivers since the pulses from other transceivers collide with the pulses of the busy tone.

In the scenario of FIG. 1 it is ensured by a single transceiver that receiving nodes within the range of the transceiver cannot receive any signals with a low pulse rate from other transceivers. By contrast with this, in the form of embodiment in accordance with FIG. 2, a transmission at a high and at a low rate from two transceivers is interleaved. The signal sequence shown in FIG. 2 largely corresponds to the signal sequence of FIG. 1. By contrast with FIG. 1, the pulses are now however transmitted by two transceivers, namely a transceiver $T_H$, which transmits pulses with a high pulse rate and low energy, and by a transceiver $T_L$, which transmits with a low pulse rate and high energy. The difference in the pulse energies can be seen from the different heights of pulse of the respective rate. Time slots for the high pulse rate and the low pulse rate are selected in this figure in a similar way to FIG. 1. This means that pulses with a high pulse rate are transmitted in time windows T1 to T4, T6 to T9 and T10 to T14 and pulses with a low pulse rate are transmitted in the time windows T0, T5, T10 and T15. Unlike in FIG. 1, the pulses are now transmitted with the low pulse rate by a separate transceiver $T_L$, which transmits the bit sequence 0001 in the time segment of FIG. 2. This sequence now no longer represents the busy tone but corresponding information is transmitted by this at a low rate which can be received by the corresponding receiver $R_L$ which only hears the low pulse rate in the time window. In parallel to this, in a similar manner to FIG. 1, the pulses of the high rate are received by the receiver $R_H$. In accordance with FIG. 2 data transmission in parallel is thus made possible between a pair of transmitting and receiving nodes with a high rate and a pair of transmitting and receiving nodes with a low rate.

Figure 2:
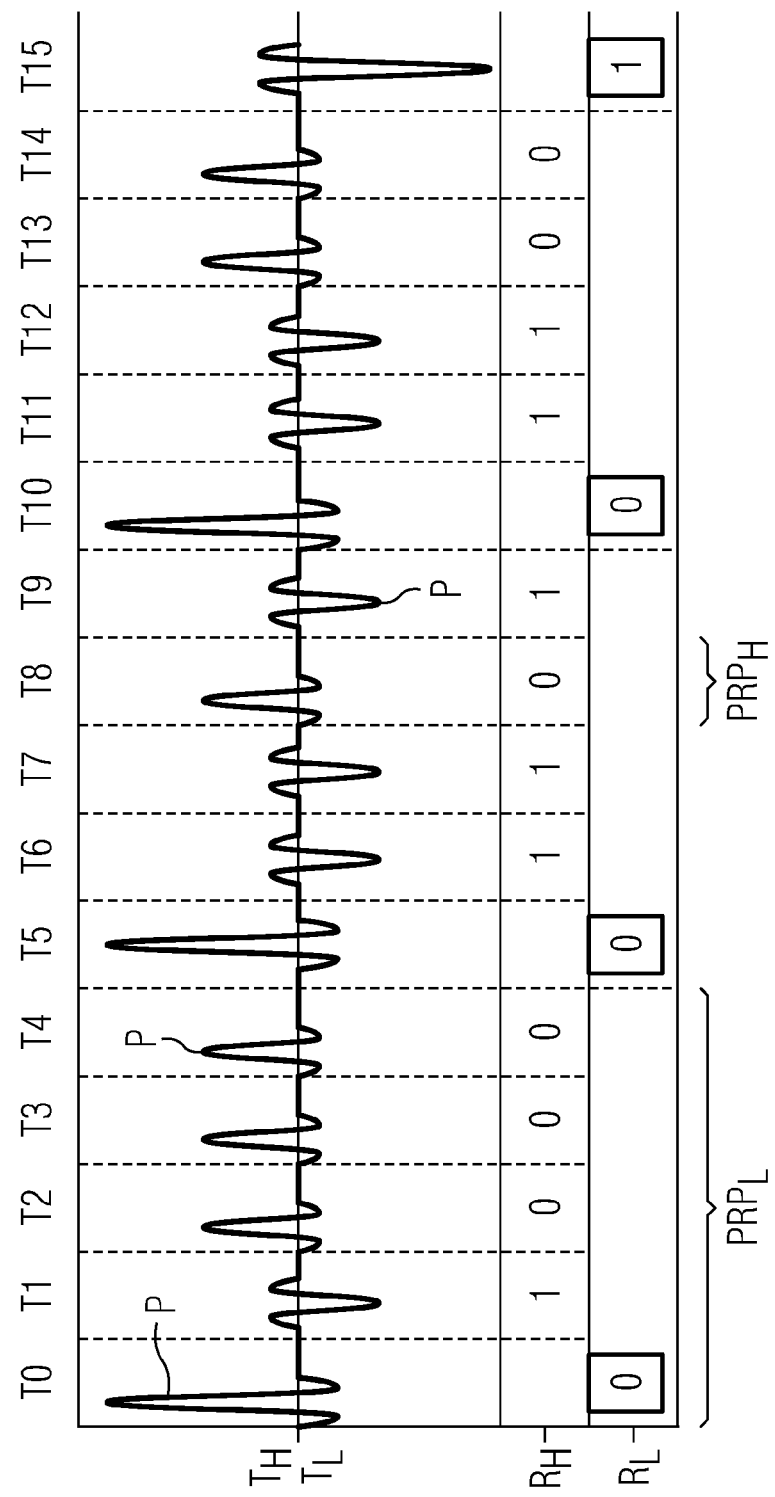
FIG. 2 is a schematic diagram of the transmission of a UWB signal in accordance with a second embodiment of the method.
Figure 3:
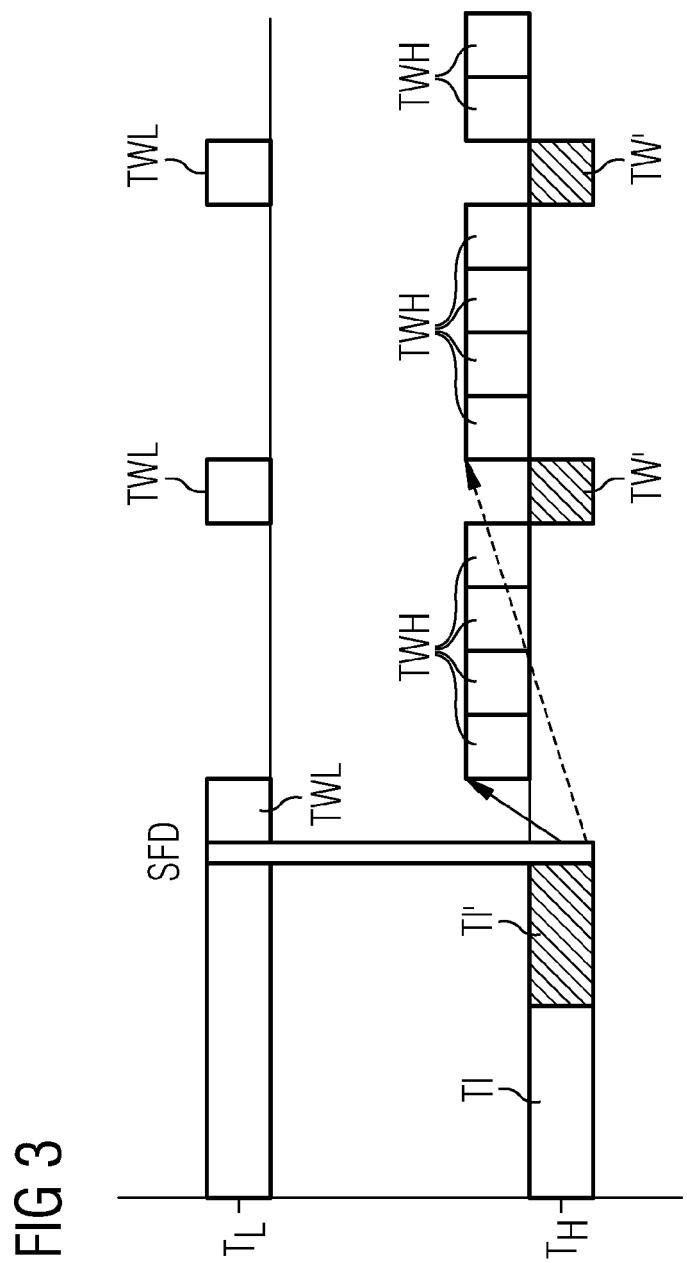
FIG. 3 is a schematic diagram of a synchronization between transmitting and receiving nodes carried out in an embodiment of the method.

In the above forms of embodiment in accordance with FIG. 1 and FIG. 2 the transmitting and receiving nodes run bit-synchronously. An implementation of an appropriate node synchronization is depicted in FIG. 3. A so-called synchronization preamble is used in this case for synchronization. The transmission of synchronization preambles is known per se in such cases and is typically used to prevent bit collisions in time slot protocols. In the form of embodiment of FIG. 3 the synchronization preamble SP transmitted by a transceiver $T_L$ transmitted at a low pulse rate is not only used for synchronization of transmitting or receiving node to the low pulse rate but also for synchronization of transmitting and receiving node to the high pulse rate. FIG. 3 illustrates, within the context of a timing diagram with a time axis running horizontally, the initial transmission of the synchronization preamble SP by the transceiver $T_L$ at the low data rate, followed by a Start of Frame Delimiter SFD. After the Start of Frame Delimiter SFD the data is transmitted at the low rate, which is indicated by the corresponding time windows TWL. For synchronization to the high pulse rate the corresponding transmitting and receiving nodes hear the high rate first of all in the next time slot. If the transmission at a low pulse rate is taking place in this time slot, the transmitting and receiving node can listen in to the synchronization preamble SP and synchronize themselves to it.

In the scenario of FIG. 3, as well as the transmitted signal sequence of a transceiver $T_L$ with low pulse rate, a possible signal sequence of a transceiver $T_H$ is also shown which is transmitting with a high pulse rate. As already described above there is a synchronization to the synchronization preamble SP of the transceiver $T_L$ if the data transmission at a low pulse rate is taking place in parallel. The data transmission at the high pulse rate which is synchronized with the data transmission at the low pulse rate is indicated in this figure by the corresponding time windows TWH.

If the two data transmissions at high and low pulse rate are to take place in parallel, there may also be the possibility of the transceiver $T_H$ listening in the time slots of the low rate, which is indicated by time slots TW' shown appropriately cross-hatched. A corresponding correction of the synchronization can be undertaken through this during the data transmission. Should the transceiver $T_H$, on listening in the next time slot within a prespecified time interval, which is labeled TI in FIG. 3 for example, not find any synchronization preamble of the data transmission at the low pulse rate, it transmits a synchronization preamble at the high rate itself. This synchronization preamble is transmitted in such cases in the time interval TI' shown cross-hatched. The transmitting node and receiving node which are transmitting and receiving at the high rate then synchronize themselves by this synchronization preamble.

To guarantee freedom from collisions a time slot protocol known per se from the related art, such as Slotted CSMA (CSMA=Carrier Sense Multiple Access) for example is used. In this protocol each data transmission begins with a known synchronization preamble. Before a transmitting node can transmit it must listen on the channel for such a preamble (Preamble Sensing Multiple Access—PMSA).

In a variant of the method two nodes which have data to transmit signal to each other that they are close enough to each other to be able to transmit and receive at the high pulse rate. That transmission at the high pulse rate is possible can typically be detected from the SNR (Signal-to-Noise Ratio) of the signals. The signaling is typically undertaken in such cases by the transmitting node sending a specific RTS packet (RTS=Ready To Send) at the low pulse rate, with a higher pulse rate being described in this packet. The receiving node confirms the RTS packet with a corresponding CTS packet (CTS=Clear To Send), which is likewise transmitted at the low pulse rate. The use of RTS or CTS packets is sufficiently known from the related art and is used for example in time slot protocols. After the exchange of the packets, the transmitting and the receiving nodes switch to a high pulse rate so that in the next time slot they can transmit or receive at the high pulse rate. The data transmission at the high pulse rate is once again synchronized by a suitable method with the low pulse rate so that the gaps of the low pulse rate coincide with a corresponding pulse of the high pulse rate.

As already illustrated with reference to FIG. 1, an individual transmitting node can transmit data at the high pulse rate and use the low data rate for transmission of a busy tone.

There is also the possibility of the transmitting node transmitting exclusively at the high pulse rate and not transmitting any signals at the low pulse rate, by which the interleaving method according to FIG. 2 is made possible, in which information can be transmitted via a further transmitting node at low pulse rate. In the interleaving method a transmitting node will thus transmit at a low rate to the receiving node while another transmitting node synchronizes at a high pulse rate to the transmission and transmits its pulses to a receiving node precisely in the gaps between the pulses. This means that two data transmissions run in parallel with high and low data rate which do not disturb each other.

Depending on whether a transmitting node is transmitting with the busy tone method in accordance with FIG. 1 or with the interleaving method in accordance with FIG. 2, this has consequences for the data transmissions within the range of the transmitting node. With the busy tone method transmissions within the range of the node transmitting the busy tone are suppressed. If for example a node is within the range of this node and wishes to transmit, it first listens for the low rate in the channel. It then receives the busy tone and recognizes from this that the channel is in use. It then performs a so-called backoff mechanism over a random number of time slots until the next attempt to transmit at the low pulse rate.

If a node is located outside a node transmitting at the high pulse rate, this node does not hear the busy tone and therefore assumes a free channel on which it transmits with the low pulse rate. If the node is pulse-synchronous with the node transmitting at the high pulse rate, the pulses of the transmission at the low pulse rate coincide with the pulses of the busy tone. Since the low pulse rate is ignored by the receiver receiving the data with the high pulse rate however, the transmission is not disrupted by the node transmitting at the low pulse rate.

FIG. 4 to FIG. 12 once again show corresponding scenarios of the data transmission between transmitting and receiving node based on a busy tone method or on the interleaving method. The transmitting and receiving nodes are configured to be able both to transmit and also to receive signals in such cases. In all figures the corresponding transmitting nodes are indicated by cross-hatched circles with reference character S1 or S2. The range of the respective transmitting node S1 for a data transmission at high pulse rate is indicated here by respective circles C. The corresponding receiving nodes are also labeled E1 or E2 respectively in FIG. 4 to FIG. 12 and shown as white circles. A data transmission at a high rate between a transmitting and receiving node is shown in FIG. 4 through FIG. 12 by a solid arrow, while a data transmission at a low pulse rate is shown by a dotted arrow. In addition the receipt of data at a high or at a low rate at a node for which the data is not intended is indicated by a solid line (without an arrow head) for the high pulse rate and a dotted line (without an arrow head) for the low pulse rate.

Figure 4:
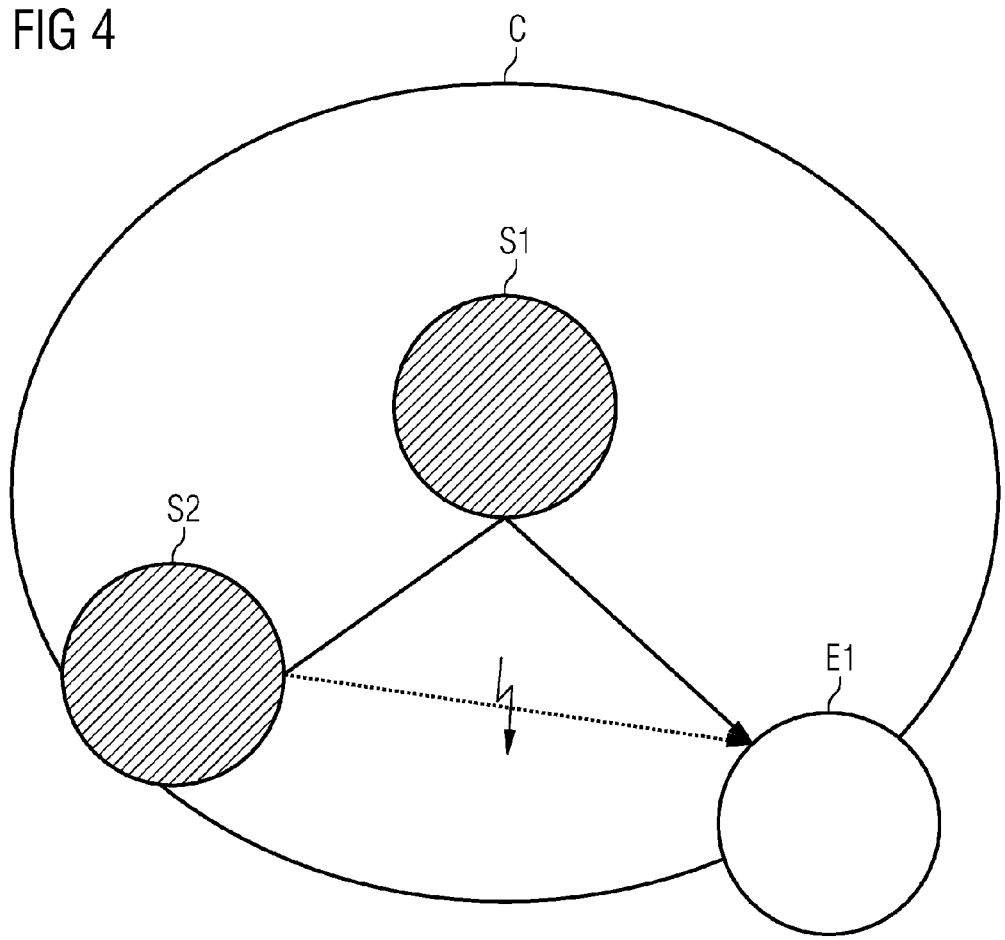
Figure 5:
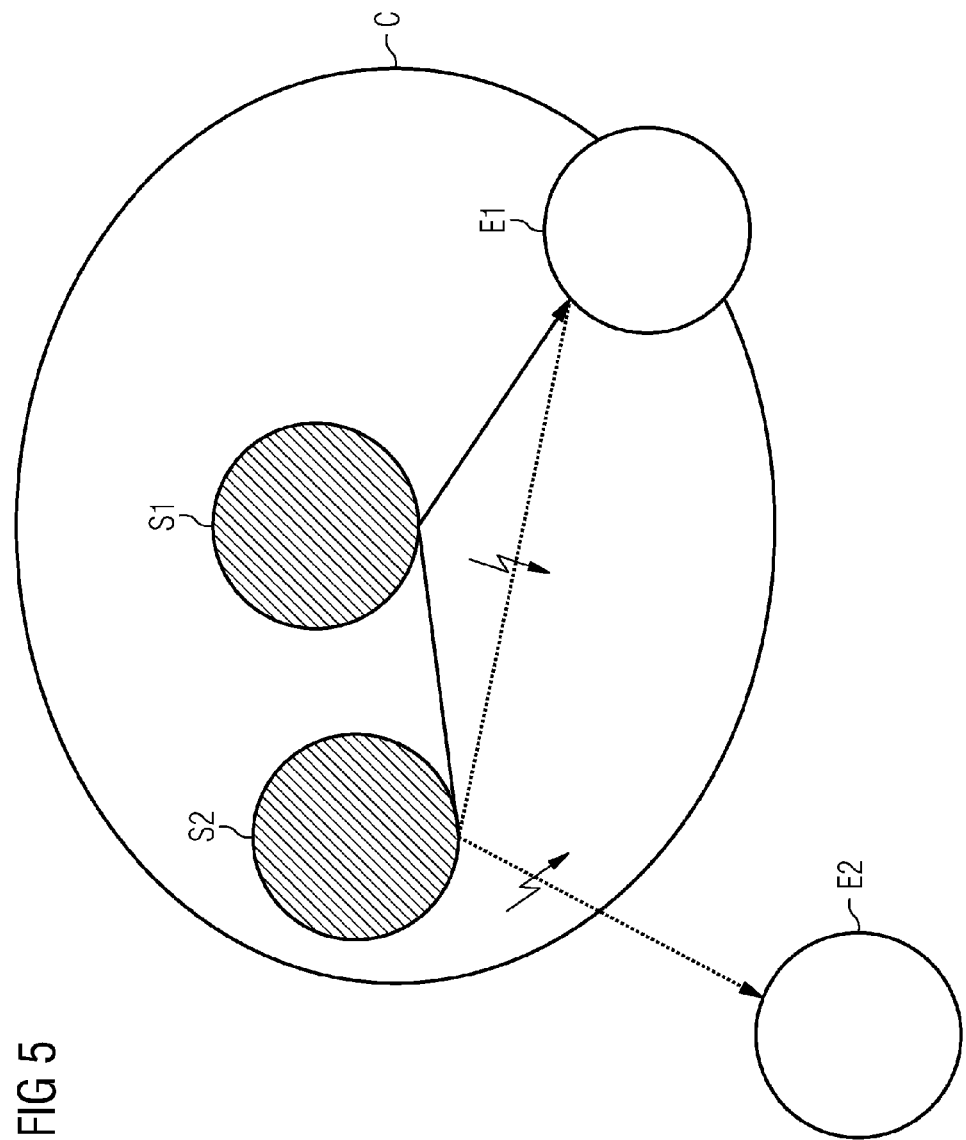

FIG. 4 shows a scenario in which a transmitting node S1 is transmitting at a high data rate to a receiving node E1 and in doing so transmits a busy tone. A further transmitting node S2, which wishes to transmit at a low rate to the receiving node E1, receives the busy tone of the transmitting node S1 since it is located within range thereof. Thus a data transmission of the transmitting node S2 to the receiving node E1 is not allowed, which is indicated by a lightning bolt sign in FIG. 4. In the scenario of FIG. 5 the transmitting node S1 is again transmitting at the high data rate to the receiving node E1 and in doing so simultaneously transmits the busy tone. A transmitting node S2 that wishes to transmit to a receiving node E2 outside the range of the transmitting node S1 listens in the channel and receives the busy tone so that the transmission at the low pulse rate is not allowed, which is again indicated by lightning bolts.

Figure 6:
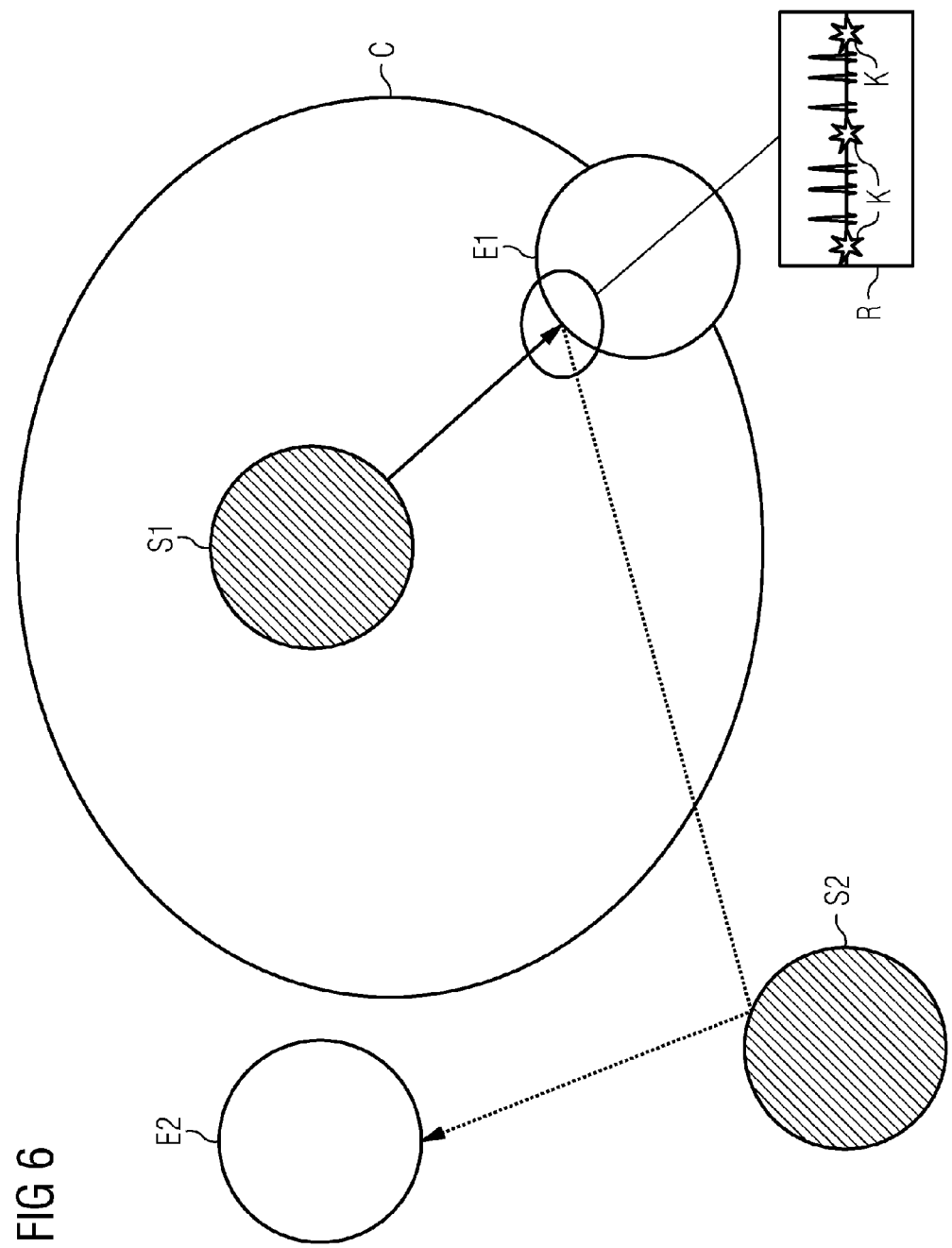

In the scenario of FIG. 6 the transmitting node S1 transmits data at the high data rate in combination with a busy tone to the receiving node E1. In addition a further transmitting mode S2 outside the range of the transmitting node S1 transmits at the low data rate to a receiving node E2 which is likewise outside the range of the transmitting node S1. Since the busy tone is not able to be received by the node S2, the transmission of pulses at the low rate is not allowed. However this leads to the signal at the low pulse rate also being received unintentionally at the node E2. This actually results in collisions at the low pulse rate, as is indicated by a correspondingly shown sequence of pulses with collision positions K within a rectangle R. However these collisions are not non-critical since the receiving node E1 is only receiving at the high pulse rate and ignores the pulses of the low pulse rates.

Figure 7:
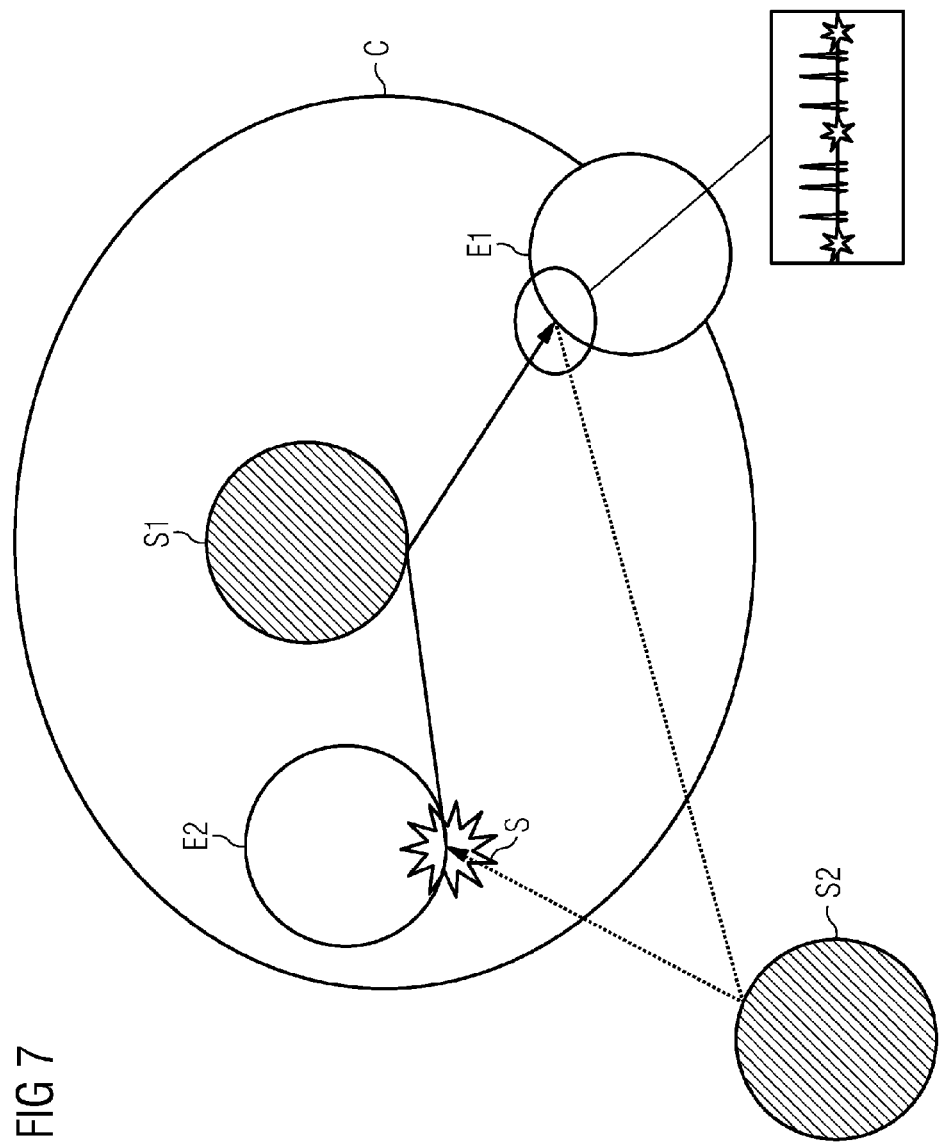

FIG. 7 shows a scenario in which the transmitting mode S1 transmits data with a high pulse rate in combination with a busy tone to the receiver E1. Furthermore a transmitter S2 transmits data to a receiver E2 at the low pulse rate which is located within the range of the transmitter S1 and thus also receives the busy tone from the transmitter S1. Similarly to FIG. 6, collisions occur at the receiver E1 at which the signal of the transmitter S2 also arrives. Since the receiver E1 ignores the pulses of the low pulse rate however the data transmission between transmitter S1 and receiver E1 is not disrupted. The transmission of the data at the low pulse rate from the transmitter S2 to the receiver E2 is not possible however since, as a result of the busy tone of transmitter S1, collisions occur at receiver E2, as is indicated by a corresponding star symbol S.

Figure 8:
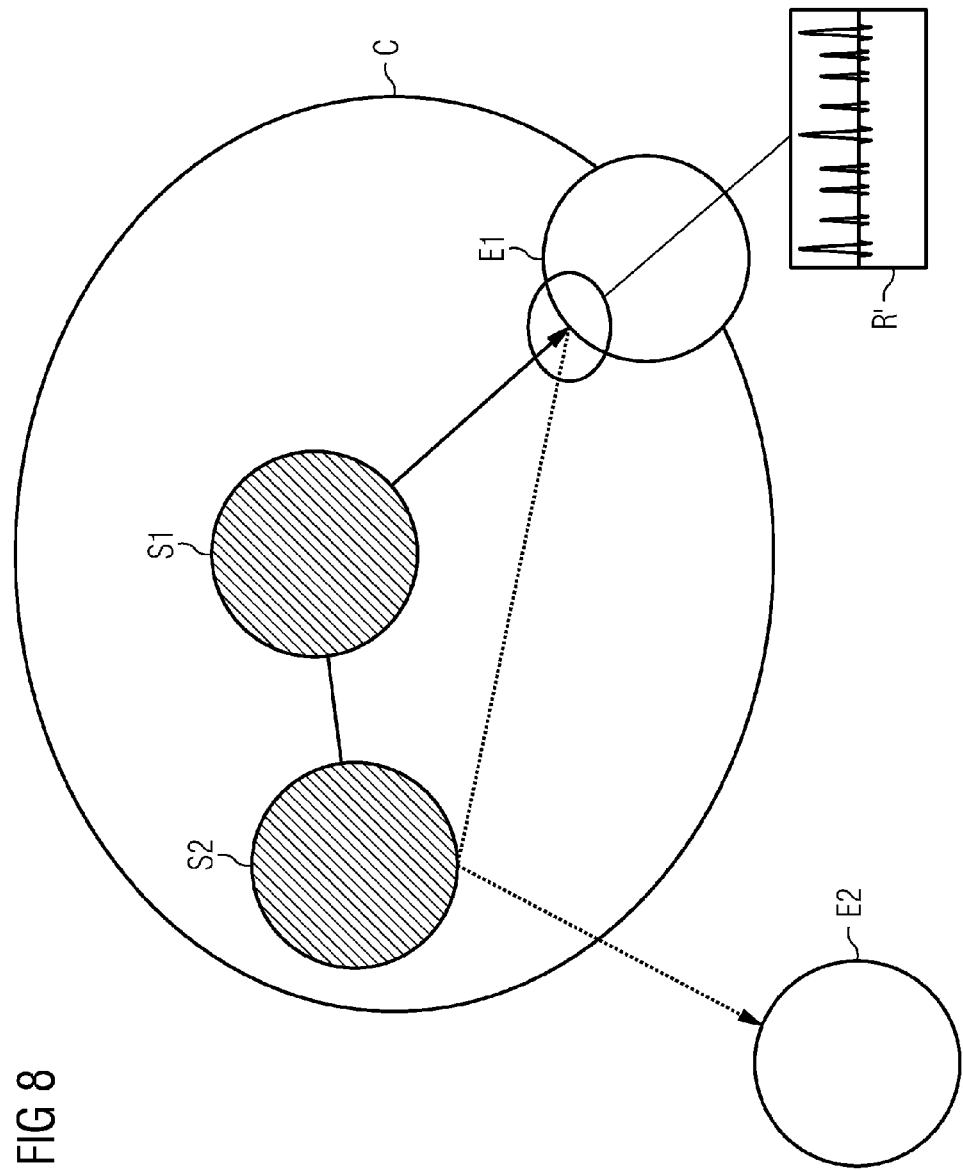

FIG. 8 shows a scenario of an interleaving method in which the transmitter S1 now transmits data with no busy tone at the high rate to the receiver E1. A transmitter S2 within the range of transmitter S1 also transmits data at the low pulse rate to a receiver E2. The data transmitted with the low pulse rate also reaches the receiver E1. No collisions occur in such cases since no busy tone is transmitted by the transmitter S1. The freedom from collisions is indicated by the pulse sequence in the rectangle R' of FIG. 8. The receiver E1 in such cases only evaluates the pulses of the high pulse rate and ignores the pulses of the low pulse rate. In the scenario of FIG. 8 the transmission of the data at the low rate from the transmitter S2 to the receiver E2 is made possible since at the low rate no busy tone reaches the transmitter S2 from the transmitter S1.

FIG. 9 again shows a scenario in which the transmitter S1 is transmitting data at a high pulse rate without a busy tone to a receiver E1. The further transmitter S2 lies outside the range of transmitter S1 and transmits data at a low pulse rate to a further receiver E2 which likewise lies outside the range of transmitter S1. The data at the low rate also reaches the receiver E1, but does not cause any collisions since no busy tone is received at E1. The freedom from collisions is again indicated by the pulse sequence in the rectangle R'. There is also no disruption of the transmission from the transmitter S1 to the receiver E1 since the receiver E1 ignores the pulses at the low pulse rate.

Figure 9:
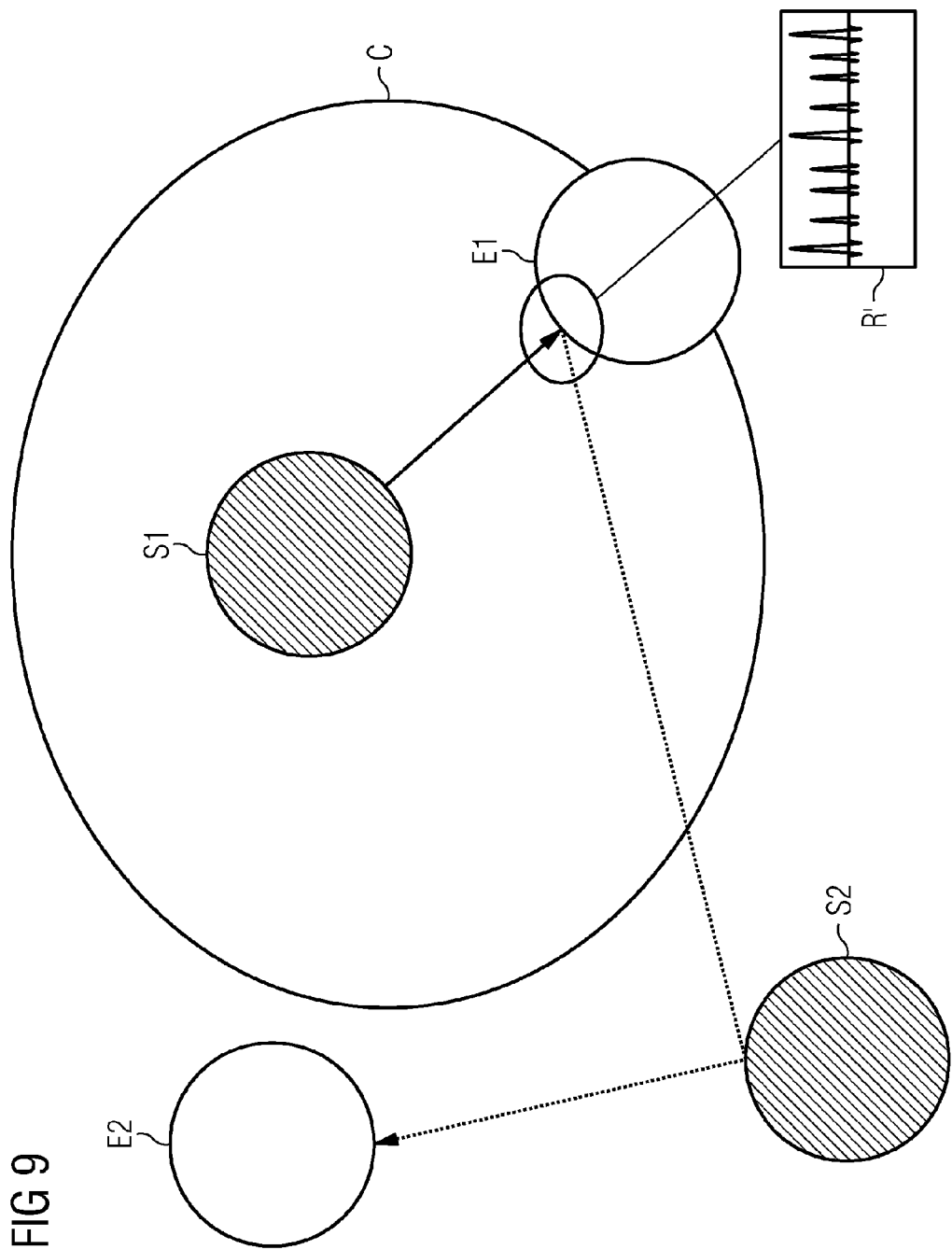
Figure 10:
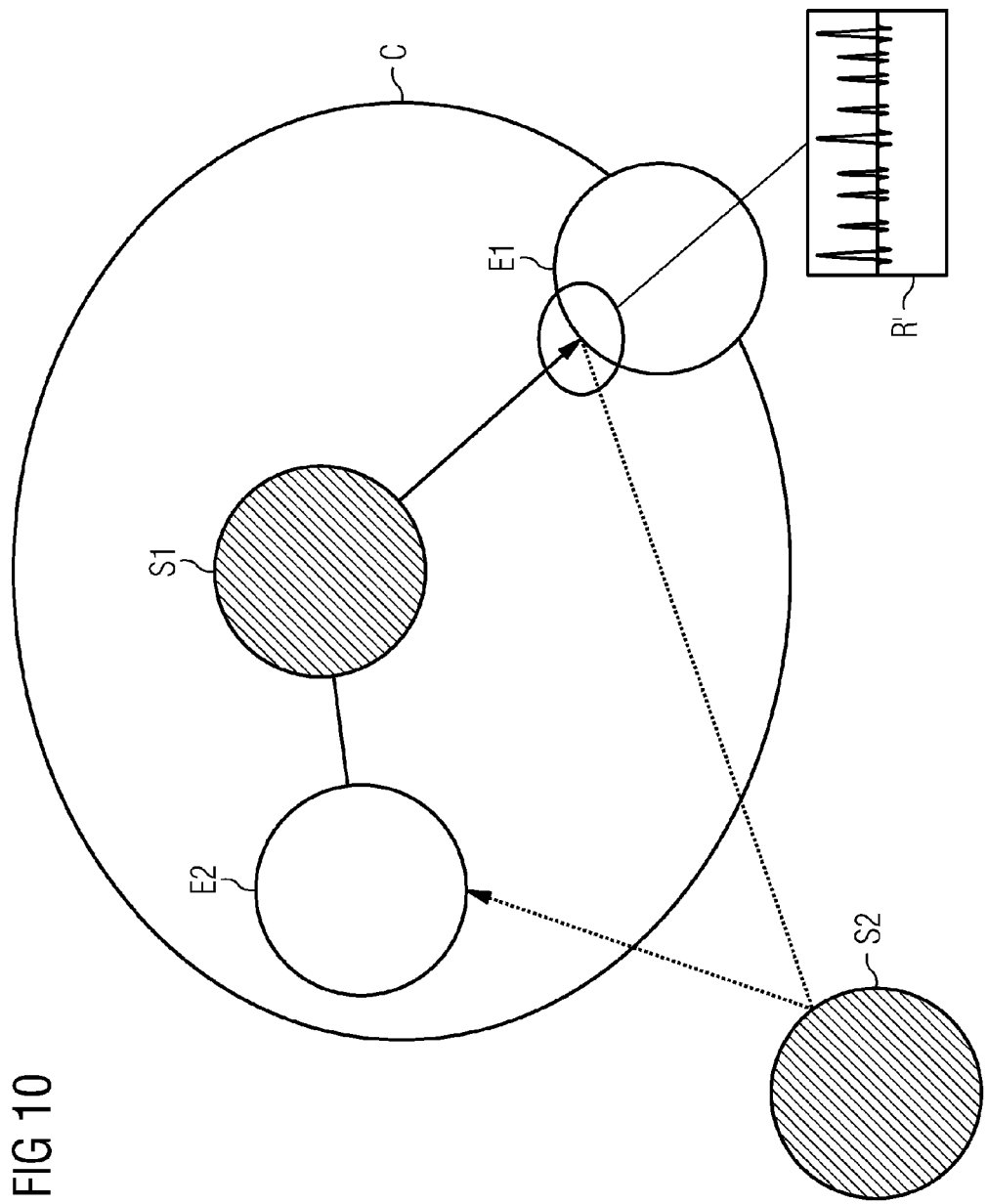

FIG. 10 shows a scenario similar to that of FIG. 9, wherein however the receiver E2 now lies within the range of transmitter S1. This means that the signals at the high pulse rate reach the receiver E2 from the transmitter S1. However this does not cause any disruption to the data transmission, since the receiver E2 which is listening at the low pulse rate ignores the pulses at the high pulse rate and no busy tone is transmitted by the transmitter S1. The data transmission at the high rate from the transmitter S1 to the receiver E1 can also—in a similar way to FIG. 9—take place without disruption, since the receiver E1 ignores the pulses at the low pulse rate which arrive at the receiver E1 from the transmitter S2.

Figure 11:
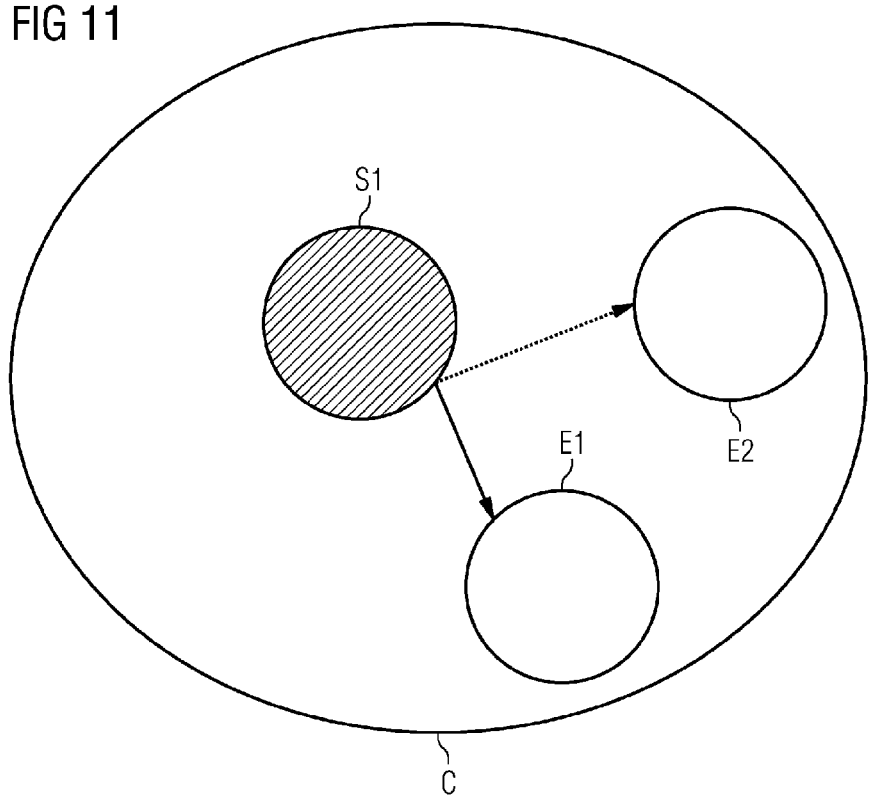

FIG. 11 shows a scenario in which an individual transmitter S1 simultaneously transmits data to two receivers E1 and E2 at a high and a low rate. The data transmitted to the receiver E1 is transmitted in this case at the high pulse rate and the data to the receiver E2 at the low pulse rate. The two data transmissions are configured in this case such that they have essentially the same range. FIG. 12 shows a scenario similar to that of FIG. 11, with the data transmission at the low pulse rate now having a longer range than the data transmission at the high pulse rate.

In the forms of embodiment described above the high pulse rate is transmitted as a multiple of the low pulse rate, with the "common" pulses of the two rates being used exclusively by the low rate. This means that pulses of the low rate do not collide with those of the high rate. In this way a simultaneous transmission at high and low data rate in the same medium is possible. In such cases the individual transmitting or receiving nodes do not have to be explicitly coordinated or coordinated from outside, provided they are synchronized to an exact pulse. Thus an adaptive system is created which can dynamically adapt both the data rate and also the range using the pulse rate. It is possible to implement the system with a single, low-cost standard component based on a transceiver operating according to Standard IEEE 802.15.4a.

FIG. 13 shows a further variant of the method in which the pulses are now transmitted at the low rate in so-called bursts, through which very short, high-energy pulse sequences followed by long pauses are transmitted. A bit is encoded by one burst in this case. In the form of embodiment described here the bursts at the low rate are transmitted based on the Standard IEEE 802.15.4a. FIG. 13 shows the transmission in accordance with this standard, with a time axis running in the horizontal direction. The information is transmitted in this case in so-called symbol intervals $T_{SI}$ which are each divided into two part intervals $T_{BPM}$. Each of these equal-length part intervals $T_{BPM}$ in its turn contains two intervals $T_{BP}$ and $T_{GI}$. The two front intervals $T_{BP}$ are used for transmitting the bursts. The intervals $T_{GI}$ which each represent the two halves of the interval $T_{BPM}$, are so-called guard intervals in which no bursts are transmitted. The guard intervals serve in this case as a safety margin in order to reduce intersymbol interference.

The intervals $T_{BP}$ are divided up into a number of so-called Time Hopping Positions of length $T_B$, which are shown as corresponding squares. A burst can be transmitted in a corresponding Time Hopping Position of an interval $T_{BP}$ and the length $T_B$ of a Time Hopping Position corresponds to the length of a burst. In FIG. 2 a burst B for one of the Time Hopping Positions is shown by way of example in the front area of the symbol interval $T_{SI}$. Each burst B in this case contains a number of so-called chips with a length of $T_C$, with each chip corresponding to the length of a pulse. Only one burst is transmitted in each case in a symbol interval, with a further bit being encoded by the position of the burst in the front or rear interval $T_{BP}$.

With transmission at a low pulse rate in accordance with the symbol structure of FIG. 13, although data can be transmitted at a relatively long range of approximately 30 to 40 meters in typical indoor environments and up to 140 meters with a line of sight between transmitting and receiving node, the data rate of the transmission is only very low. It has been recognized however that the corresponding guard intervals $T_{GI}$ in the symbol structure of FIG. 13 can be used to simultaneously to transfer data at a high pulse rate with low energy. In the form of embodiment described here the guard intervals $T_{GI}$, i.e. the gaps between the intervals $T_{BP}$, used for the bursts of the low pulse rate are used to transmit with a high pulse rate. In such cases the respective entire interval $T_{GI}$ may be utilized. In such cases burst-modulated data can again be transmitted, i.e. the pulses are transmitted in bursts which each encode one bit. However there is also the possibility— analogously to the transmissions in accordance with FIG. 1 and FIG. 2—of transmitting information pulse-modulated, with each individual pulse encoding one bit.

A transceiver which uses the variant of the method just described initially synchronizes to the symbol interval of a transmission that is beginning in accordance with Standard IEEE 802.15.4a. Once again this typically occurs by it listening for the synchronization preamble. The transceiver then switches into a transmit mode with high pulse rate. It uses the guard intervals $T_{GI}$ of the existing low-bit-rate transmission for this in order to carry out a transmission in these intervals at a high pulse rate with correspondingly low energy to a receiver located close by. The fact that each pulse is transmitted with very low energy during transmission at a high pulse rate means that the interference generated is minimal. In this form of embodiment a slightly higher Gaussian noise arises for the receivers operating at the low pulse rate. The interference generated is normally unproblematic because of the very low energy level of the high pulse rate. It can however additionally be reduced as much as possible by suitable signaling on the MAC layer. For example the MSI (MSI=Maximum Sustainable Interference) of the receivers could be signaled.

The energy with which a pulse of the high pulse rate can be transmitted is dependent on the symbol structure used in the underlying IEEE 802.15.4a connection, which is once again defined by the data rate. This structure reflects aspects such as the width of the guard intervals $T_{GI}$ (as number of time slots $T_B$). It is consequently specified by this how many pulses of the high pulse rate can be transmitted per symbol interval $T_{BPM}$.

As already discussed above, the pulses of the high pulse rate which are sent in the intervals $T_{GI}$ can be either individually modulated or combined as a burst in each case. Depending on how many chips per burst, (i.e. how many pulses within a burst) are used, additional redundancy is produced. For a pulse-modulated transmission the high data rate is the number of chips per symbol interval multiplied by the symbol rate divided by two. By contrast the high data rate in the burst modulation is the number of bursts per symbol interval multiplied by the symbol rate and divided by two. Depending on the IEEE 802.15.4a connection used and as a function of whether burst modulation or pulse modulation is used, short-range data transmissions for the data rate of up to 250 Mbits per second can be achieved in such cases.

The embodiment of the method illustrated with reference to FIG. 13 has the advantage of a standard radio module in accordance with IEEE 802.15.4a also being able to be used for fast data transmission over short distances without disrupting the standard communication at a low data rate based on IEEE 802.15.4a. This makes possible a system which uses the Standard IEEE 802.15.4a for signaling and communication at a low data rate over longer distances, with a short-range data transmission with a fast data rate also being provided by utilization of the guard intervals. Thus standard transceivers for long-range communication at a low data rate can additionally communicate over short distances with a very high data rate.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for pulse-based ultra wide band communication, comprising:
    transmitting an ultra wide band signal to at least one receiving node from at least one transmitting node, using first pulses at a first pulse rate in sending a first data transmission and, in at least one second data transmission, using second pulses at a second pulse rate higher than the first pulse rate, the at least one second data transmission occurring in at least one time interval between sequential first pulses transmitted at the first pulse rate.

2. The method as claimed in claim 1, wherein the pulses of the ultra wide band signal are transmitted continuously in consecutive time windows with a constant length, with each time window containing an individual pulse.

3. The method as claimed in claim 2, wherein first time windows of the consecutive time windows are available for pulses at the first pulse rate and second time windows are available for pulses at second pulse rates, with the first and second pulse rates determined by a repeat rate of the first and second time windows.

4. The method as claimed in claim 2, wherein both the first data transmission and at least one second data transmission are carried out between an individual transmitting node and an individual receiving node.

5. The method as claimed in claim 4, wherein a prespecified signal pattern is transferred by the first data transmission, thereby blocking transmission of data at the first pulse rate from other transmitting nodes for the at least one receiving node within range of the individual transmitting node.

6. The method as claimed in claim 1, wherein for the transmitting and receiving nodes within range of each other, the first data transmission or a respective second data transmission occurs exclusively between a pair of transmitting and receiving nodes.

7. The method as claimed in claim 1, wherein collisions between the first data transmission and the at least one second data transmission are prevented by a time slot protocol.

8. The method as claimed in claim 1, wherein the at least one transmitting node and the at least one receiving node synchronize with each other using synchronization preambles.

9. The method as claimed in claim 8, wherein the at least one transmitting node and the at least one receiving node listen to the first data transmission before executing the at least one second data transmission and, on receiving a synchronization preamble, synchronize to the synchronization preamble.

10. The method as claimed in claim 9, wherein, if the at least one transmitting node and the at least one receiving node do not receive any synchronization preamble, the at least one transmitting node transmits the synchronization preamble as a first of the at least one second data transmission.

11. The method as claimed in claim 10, wherein the at least one transmitting node which is transmitting data by the at least one second data transmission listens for the pulses at the first pulse rate to synchronize thereto and/or to correct a synchronization that has already taken place.

12. The method as claimed in claim 1, wherein the at least one transmitting node and the at least one receiving node between which data is to be transmitted signal to each other when the at least one second data transmission is possible subsequently to transmit the data using the at least one second data transmission.

13. A method for pulse-based ultra wide band communication, comprising:
    transmitting an ultra wide band signal using a plurality of pulses to at least one receiving node from at least one transmitting node, where the pulses have a first pulse rate in a first data transmission in bursts of at least one pulse in prespecified time intervals separated from each other by guard intervals and, in at least one second data transmission, the pulses have a respective second pulse rate higher than the first pulse rate, the at least one second data transmission formed of the pulses transmitting at the respective second pulse rate in the guard intervals when no pulses are transmitted at the first pulse rate.

14. The method as claimed in claim 13, wherein the first data transmission is undertaken in accordance with Standard IEEE 802.15.4a.

15. The method as claimed in claim 14, wherein all the guard intervals are used for the at least one second data transmission.

16. The method as claimed in claim 15, wherein the data transmitted by the pulses at the second pulse rate is pulse-modulated.

17. The method as claimed in claim 15, wherein the data transmitted by the pulses at the second pulse rate is burst-modulated.

18. A communication network for pulse-based ultra wide band communication, comprising:
    nodes, including at least one transmitting node and at least one receiving node, communicating via an ultra wide band signal using first pulses at a first pulse rate in sending a first data transmission and, in at least one second data transmission, second pulses at a second pulse rate higher than the first pulse rate, the at least one second data transmission occurring in at least one time interval between sequential first pulses transmitted at the first pulse rate.

19. A communication network as claimed in claim 18, wherein the pulses of the ultra wide band signal are transmitted continuously in consecutive time windows with a constant length, with each time window containing an individual pulse.

20. A communication network as claimed in claim 18, wherein for the transmitting and receiving nodes within range of each other, the first data transmission or a respective second data transmission occurs exclusively between a pair of transmitting and receiving nodes.

21. A communication network as claimed in claim 20, wherein a prespecified signal pattern is transferred by the first data transmission, thereby blocking transmission of data at the first pulse rate from other transmitting nodes for at least one receiving node within range of an individual transmitting node.

22. A communication network as claimed in claim 18, wherein the nodes listen to the first data transmission before the at least one transmitting node executes the at least one second data transmission and, on receiving a synchronization preamble, the at least one transmitting node and the at least one receiving node synchronize to the synchronization preamble.

23. A communication network for pulse-based ultra wide band communication, comprising:
nodes, including at least one transmitting node and at least one receiving node, communicating via an ultra wide band signal using first pulses at a first pulse rate in sending a first data transmission in bursts of at least one pulse in prespecified time intervals separated from each other by guard intervals and, in at least one second data transmission, the pulses have a respective second pulse rate higher than the first pulse rate, the at least one second data transmission formed of the pulses transmitting at the respective second pulse rate in the guard intervals when no pulses are transmitted at the first pulse rate.

* * * * *